J. A. BENGTSSON.
CALIPERS, DIVIDERS, OR THE LIKE.
APPLICATION FILED MAR. 27, 1920.
1,367,765.
Patented Feb. 8, 1921.
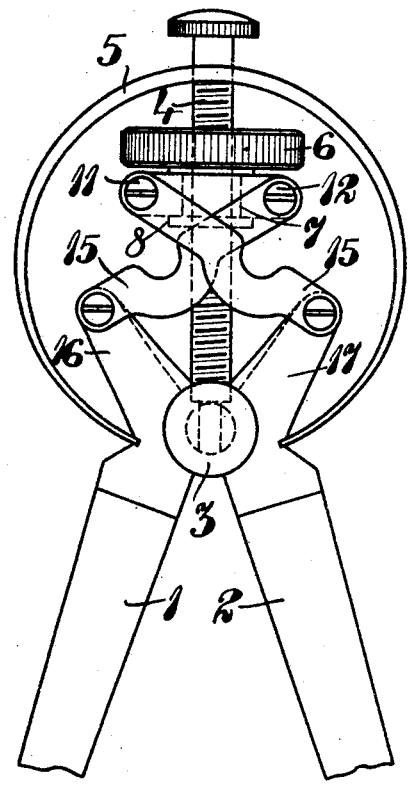
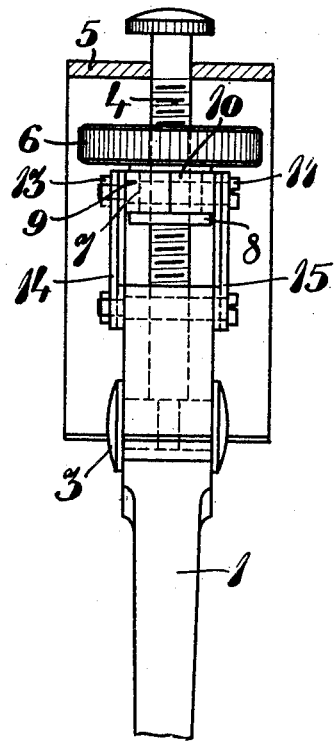
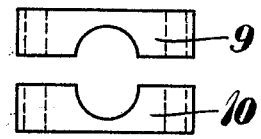
Inventor
Johan August Bengtsson
By Henry Orth Jr. atty.

UNITED STATES PATENT OFFICE.

JOHAN AUGUST BENGTSSON, OF FALKÖPING-RANTEN, SWEDEN.

CALIPERS, DIVIDERS, OR THE LIKE.

1,367,765.     Specification of Letters Patent.     Patented Feb. 8, 1921.

Application filed March 27, 1920. Serial No. 369,353.

*To all whom it may concern:*

Be it known that I, JOHAN AUGUST BENGTSSON, a citizen of the Kingdom of Sweden, residing at Falköping - Ranten, Sweden, have invented new and useful Improvements in Calipers, Dividers, or the like, of which the following is a specification.

This invention relates to calipers, dividers or the like provided with a threaded rod which is attached to the pivot of the shanks of the calipers or dividers and carries a nut adapted to be screwed along said rod thus effecting the movement of the shanks against or by the action of a spring consisting of a preferably circular, flat spring inclosing the rod, which passes through the spring, the nut being connected with the adjacent ends of the shanks by means of links.

The feature characterizing the invention consists in the points connecting each link with the end of a shank and the nut being positioned on either side of a plane passing through the rod along the pivot.

An embodiment of the invention is illustrated in the accompanying drawing in which—

Figure 1 is a side view of a portion of a pair of calipers arranged according to the invention. Fig. 2 is another side view of said pair of calipers showing the spring in section. Fig. 3 is a detail view.

In the drawing, 1 and 2 are the shanks of the pair of calipers, 3 is their common pivot and 4 is a threaded rod attached to said pivot. A preferably circular, flat spring 5 inclosing the rod 4 and through which the rod is passed tends to move the points (not shown) of the shanks together. Placed on the rod 4 is a nut 6 connected with a sleeve 7 surrounding the rod and provided with a flange 8. Placed between the nut 6 and the flange 8 on either side of the sleeve 7 are two clamping pieces 9 and 10 adapted to be clamped to the sleeve by means of screws 11 and 12 passing through the clamping pieces and provided with nuts 13. Outside the clamping pieces 9 and 10 the screws form the pivots of the one ends of links 14 and 15, the other ends of which are connected with the adjacent ends 16 and 17 of the shanks 1 and 2 respectively. Preferably the links are so arranged in pairs that one pair 15 is connected with the one clamping piece 10, the other pair of links 14 being connected with the other clamping piece 9. As will appear from Fig. 1, the points of each link connecting the same with the nut and the end of the shank are positioned on either side of a plane passing through the rod 4 along the pivot 3.

On screwing the nut 6 down the rod 4, the links are actuated so as to move the points of the shanks apart, while counteracting the spring 5, whereas, on screwing the nut upward, the spring 5 will move the points of the shanks together. Obviously, the shanks are not disturbed in their adjusted positions by actuating the shanks, and the nut 6 is guarded against being turned unintentionally by putting down the calipers upon a table or the like, because of the nut being positioned, in a well-known manner, within the edges of the spring 5. Owing to the above-mentioned position of the connecting points of each shank, and, in spite of the limited space within the flat spring 5, said space, of course, being restricted to the least possible size, each movement of the points of the shanks in relation to each other corresponds to a greater movement of the nut 6 than would be the case if the connecting points were positioned on the same side of the plane passing through the rod 4 and the pivot 3; in other words a more accurate adjustment of the points of the shanks can be effected by the position of said connecting points shown in the drawing.

Having now described my invention, I declare that what I claim is:—

1. In a measuring instrument comprising two pivotally connected shanks, the combination of a pivot, a threaded rod attached to the pivot, a nut on said rod, and members connecting the nut with adjacent ends of the shanks, the points of connection of each member with the nut and a shank being situated on opposite sides of a plane including the axes of the rod and the pivot.

2. In a measuring instrument comprising two pivotally connected shanks, the combination of a pivot, a threaded rod attached to the pivot, a nut on said rod, and links connecting the nut with adjacent ends of the shanks, the points of connection of each link with the nut and a shank being situated on opposite sides of a plane including the axes of the rod and the pivot.

3. In a measuring instrument comprising two pivotally connected shanks, the combination of a pivot, a threaded rod attached to the pivot, a nut on said rod, a spring tending to force the shanks together, and links connecting the nut with adjacent ends of the shanks, the points of connection of each link with the nut and a shank being situated on opposite sides of a plane including the axes of the rod and the pivot.

4. In a measuring instrument comprising two pivotally connected shanks, the combination of a pivot, a threaded rod attached to the pivot, a nut on said rod, a spring tending to force the shanks together, and a pair of links placed at either side of the rod and connecting the nut with adjacent ends of the shanks, the points of connection of each link with the nut and a shank being situated on opposite sides of a plane including the axes of the rod and the pivot.

5. In a pair of calipers, the combination of a pivot connecting the shanks of said pair of calipers, a threaded rod attached to said pivot, a nut on said rod, a flat, circular spring inclosing said rod and nut and tending to force the shanks together, and a pair of links placed at either side of the rod and connecting the nut with adjacent ends of the shanks, the points of connection of each link with the nut and a shank being situated on opposite sides of a plane including the axes of the rod and the pivot.

In testimony whereof I have signed my name.

JOHAN AUGUST BENGTSSON.